(12) United States Patent
Boden

(10) Patent No.: US 6,189,186 B1
(45) Date of Patent: Feb. 20, 2001

(54) ELASTOMERIC CORD LOCK WITH DUAL CORD PASSAGES

(76) Inventor: Robert O. Boden, 1580 Gaywood Dr., Altadena, CA (US) 91001

( * ) Notice: Under 35 U.S.C. 154(b), the term of this patent shall be extended for 0 days.

(21) Appl. No.: 09/280,257

(22) Filed: Mar. 29, 1999

(51) Int. Cl.[7] .............. A44B 21/00; F16G 11/00
(52) U.S. Cl. .......... 24/129 R; 24/129 D; 24/129 W; 24/115 H
(58) Field of Search .............. 24/129 R, 129 W, 24/129 D, 115 H

(56) References Cited

U.S. PATENT DOCUMENTS

| | | |
|---|---|---|
| 1,146,934 | 7/1915 | Gleeson . |
| 1,725,748 * | 8/1929 | Alexander ............ 24/115 H |
| 1,907,629 | 5/1933 | Walty . |
| 2,015,404 * | 9/1935 | Kiddle ............... 24/129 D |
| 2,783,515 * | 3/1957 | Tobias ............... 24/129 D |
| 3,043,902 | 7/1962 | Klein . |
| 3,364,500 * | 1/1968 | Fox ................. 24/115 H |
| 3,827,790 * | 8/1974 | Wenzel ............... 24/129 W |
| 4,901,402 | 2/1990 | Begemann . |
| 5,182,838 | 2/1993 | Stenner . |
| 5,195,218 * | 3/1993 | Joseph et al. .......... 24/129 D |
| 5,440,788 | 8/1995 | Boden . |
| 5,752,848 * | 5/1998 | Youngmark ............ 24/129 R |

FOREIGN PATENT DOCUMENTS

0570769 * 2/1959 (CA) ................ 24/129 R

* cited by examiner

Primary Examiner—Victor N. Sakran
(74) Attorney, Agent, or Firm—Christie, Parker & Hale, LLP

(57) ABSTRACT

An elastomeric cord lock has two specially shaped passages extending through an elastomeric body. Lengths of cord pass through each of the passages and can be tied off at the ends to keep the cords from slipping out of the cord lock passages. Each passage has a cross section extending from a wide end to a narrower outwardly extending slot portion. The passages may, for example, have keyhole-shaped cross sections. When the lengths of cord are substantially parallel, the cord lock can easily slide along the lengths of cord. However, many applications for the cord lock require that the lengths of cord be maintained in a state of tension (for example, when the cord lock is being used to hold a drawstring tight). When outward tension is applied to the lengths of cord, the lengths are forced into the narrower slot portions, causing greater locking force to be exerted. The cord lock of the present invention thus provides greater locking force when greater force is needed. When not as much locking force is needed (i.e. when the lengths of cord are substantially parallel), the lengths of cord remain in the wider portions of the passages where less locking force is exerted. The lengths of cord can be released by manually compressing the cord lock to widen the narrow slot portions.

14 Claims, 2 Drawing Sheets

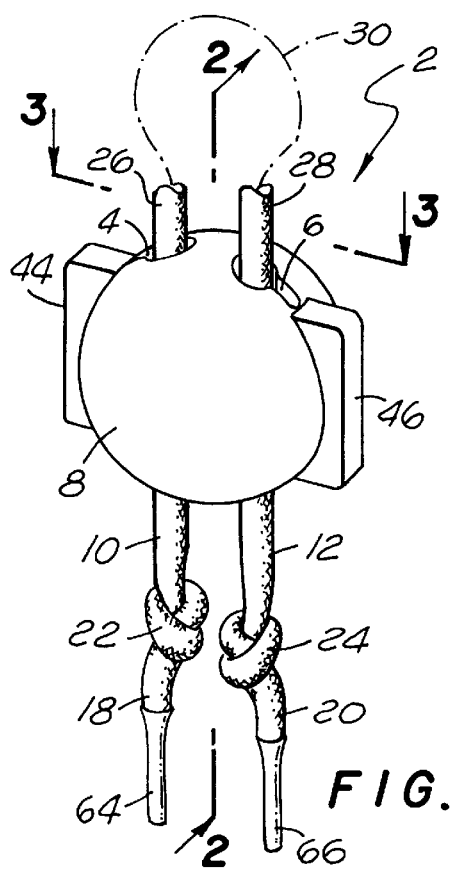
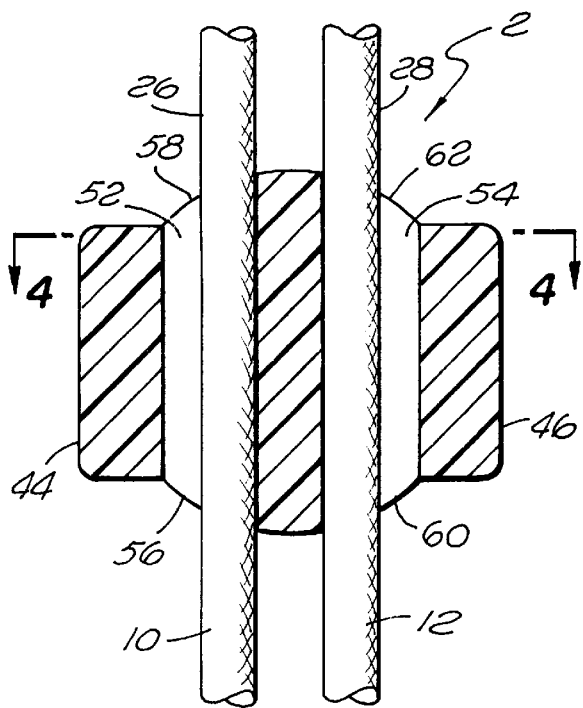
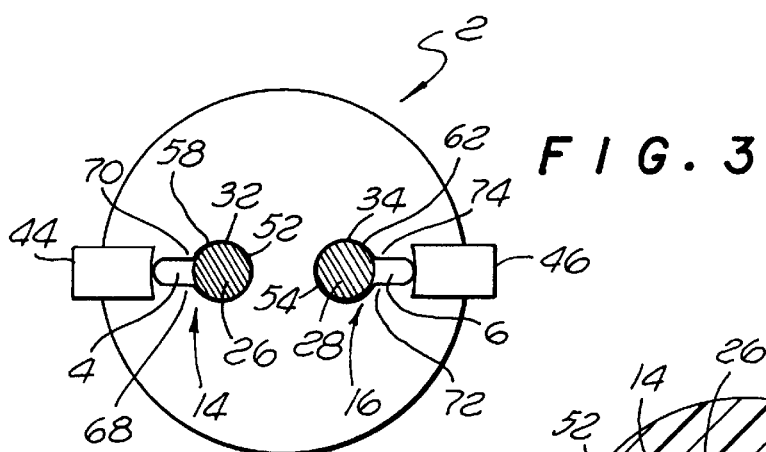
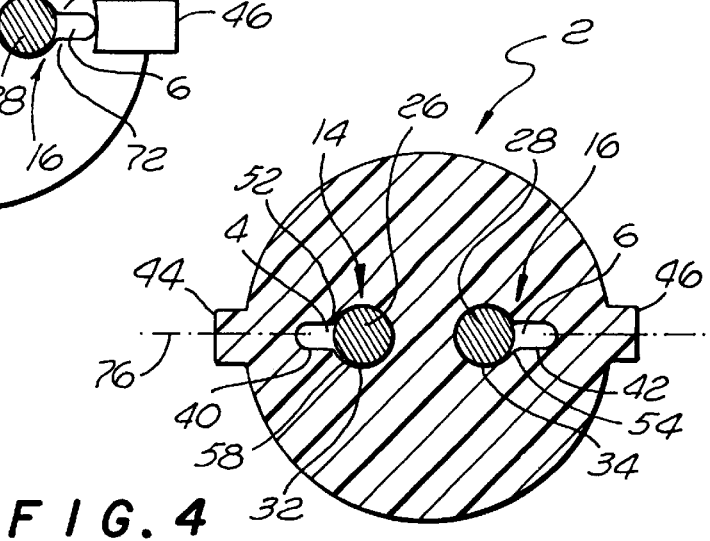
FIG. 1
FIG. 2
FIG. 3
FIG. 4

ELASTOMERIC CORD LOCK WITH DUAL CORD PASSAGES

BACKGROUND OF THE INVENTION

Various types of cord locks have been proposed in the past for holding a cord in a tightened or other desired condition in clothing, bags, shoes, and other items. Cord locks provide a convenient alternative to tying knots. Most of these prior cord locks have been formed of two or more parts, adapted to grip and release a cord by relative movement between the parts. The expense involved in forming such parts and then assembling them has limited the use of such locks, and prevented their use in many instances in which it might otherwise be desirable to utilize a lock in lieu of hand tying a cord.

Other cord locks have made use of elastomeric materials, those materials with elastic properties resembling those of natural rubber, in order to provide less expensive single-piece devices. U.S. Pat. No. 5,440,788 to Boden, which is incorporated by reference in its entirety into the present disclosure, discloses a cord lock with a single slit extending through an elastomeric body. The natural resilience of the elastomeric material holds the cords in place by forcing the walls of the body against the cords. The cords are released by squeezing on the sides of the elastomeric body. U.S. Pat. No. 5,182,838 to Stenner shows a similar cord locking device also utilizing a single slit extending though the cord lock's elastomeric body. There are several disadvantages to these prior art cord locks. First, with the prior art designs, a major inconvenience is caused by the cords pulling out from the cord lock causing the cord lock to fall off from the cord. The cords must be repeatedly rethreaded through the cord lock. Even when the ends of the cords are tied into knots, the single slit is large enough to allow the cords to slip out from the cord lock, knot and all. This problem is particularly serious when using the cord lock with infants and toddlers who often pull the cord lock off of the cords, leading to the risk of the child swallowing and choking on the cord lock.

Further, the prior art cord locks provide the same amount of locking force whether it is needed or not, rather than providing more locking force when more is required. They also use a continuous, large locking force. This large locking force is dangerous for infants and toddlers because they could put a cord fastened with such a cord lock around their necks and accidentally strangle themselves due to the relatively strong locking force preventing them from loosening the cord once it is tightened.

U.S. Pat. No. 1,907,629 to Walty discloses a soft rubber lace fastener utilizing a single opening. This invention also has the disadvantage of the cords slipping out from the cord lock and has the further disadvantage that, even when using the lace fastener, a single knot still must be tied. This invention merely keeps an existing knot from coming undone rather than eliminating the need for a knot altogether.

U.S. Pat. No. 3,043,902 to Klein discloses aplastic device for spacing a double wire transmission line. This device utilizes open slits which would allow a cord to slip out from its openings.

SUMMARY OF THE INVENTION

The elastomeric cord lock of the present invention eliminates many of the disadvantages of prior art cord locks by providing two specially shaped passages passing through an elastomeric body. Lengths of cord extend through the respective passages and can be tied off at their ends to keep them from slipping out of the cord lock passages. Each passage has a keyhole-shaped cross section formed from a wide substantially cylindrical portion and a narrower outwardly extending slot portion. When the lengths of cord are substantially parallel, the cord lock can slide relatively easily along the lengths of cord. However, many applications for the cord lock require that the lengths of cord be maintained in a state of tension (for example, when the cord lock is used to tightly fasten garments, bags or shoes). When outward tension is applied to the lengths of cord, the lengths are forced into the narrower slot portions. As more outward tension is exerted on the lengths of cord, the lengths are forced further into the narrow slot portions, and thus greater locking force is exerted on the lengths to hold them in place. The cord lock of the present invention thus provides greater locking force when greater force is needed. When not as much locking force is needed (i.e. when the lengths of cord are substantially parallel), the lengths of cord remain in the wider substantially cylindrical portion where less locking force is exerted. The lengths of cord can be released by manually compressing the cord lock to widen the narrow slot portions.

The use of elastomeric material to produce a single piece design results in a cord lock that is inexpensive to produce and can thus be utilized in a wide range of applications. Due to the relatively smaller openings of the two passage design, as compared to the single slit design, the knotted cord ends will not easily slip out of the passages. This feature serves to eliminate the major inconvenience of repeatedly re-threading the lengths of cord through the cord lock. It also serves to prevent infants and toddlers from pulling the cord lock off the lengths of cord and swallowing or choking on the cord lock. Because there is no concern that the lengths of cord, when tied off at their ends, will slip out of the cord lock passages, a lower locking force can be used, thus reducing the risk of accidental strangulation. The cord lock can be implemented so that when the lengths of cord are in the substantially cylindrical portions, the cord lock easily slides along the lengths of cord, further reducing the risk of accidental strangulation.

The smaller sized openings of the two passages can also produce increased friction between the cord and the passage by increasing the area of contact as compared to the single slit design. This feature, combined with the greater locking force of the narrower slot portions, allows the present invention the option of being implemented to provide greater locking force than the conventional, single passage cord locks.

To realize the advantages outlined above, one embodiment of the elastomeric cord lock of the present invention includes: a body of resiliently deformable elastomeric material having walls defining two passages therethrough; a first length of cord passing through the first of the passages and a second length of cord passing through the second of the passages; each of the passages, as viewed in a predetermined transverse plane, having a cross section with a wide end and a narrow end in a normal condition to which the body tends to return and thereby grip the lengths of cord against longitudinal movement through the passages; the narrow end of the cross section of each passage extending outwardly relative to the other passage; the passages being formed such that in a compressed condition caused by inward pressure on the body toward the respective narrow ends, the narrow ends are widened to release the lengths of cord. In one form, the wide ends of the cross sections are substantially circular and the narrow ends of the cross sections are outwardly extending slot portions. In another form, each of the cross sections is shaped as a keyhole when viewed in the predetermined transverse plane. The passages can also be substantially parallel to each other. The sides of the passages can be enclosed by the resiliently deformable elastomeric material. In one embodiment, the first and second lengths of cord are portions of a single cord, and in another embodiment the first length of cord is a portion of a first cord and the second length of cord is a portion of a second cord. The cord or cords can be tipped, loosely-braided cord, soft vinyl rods, rubber rods, soft vinyl tubes, or rubber tubes. In a further embodiment, the cord lock has first and second projections extending outwardly from the body and elongated essentially longitudinally of the passages. The projections are adapted so that inward pressure is exerted on the projections toward the narrow ends.

Other features and advantages of the present invention will be apparent from the following detailed description when read in conjunction with the accompanying drawings.

BRIEF DESCRIPTION OF THE DRAWINGS

In the drawings, which constitute part of this specification, embodiments demonstrating various features of the invention are set forth as follows:

FIG. 1 is a perspective view of a disclosed embodiment of the present elastomeric cord lock in the position to which it tends to return when no deformation forces are applied. Two lengths of cord are shown passing through the cord lock.

FIG. 2 is a vertical cross-sectional view of the cord lock taken on line 2—2 of FIG. 1.

FIG. 3 is a top plan view taken along the line 3—3 of FIG. 1 and showing the lengths of cord in cross section.

FIG. 4 is a horizontal cross-sectional view of the cord lock taken on line 4—4 of FIG. 2.

DETAILED DESCRIPTION OF THE PREFERRED EMBODIMENTS

Figure 5:
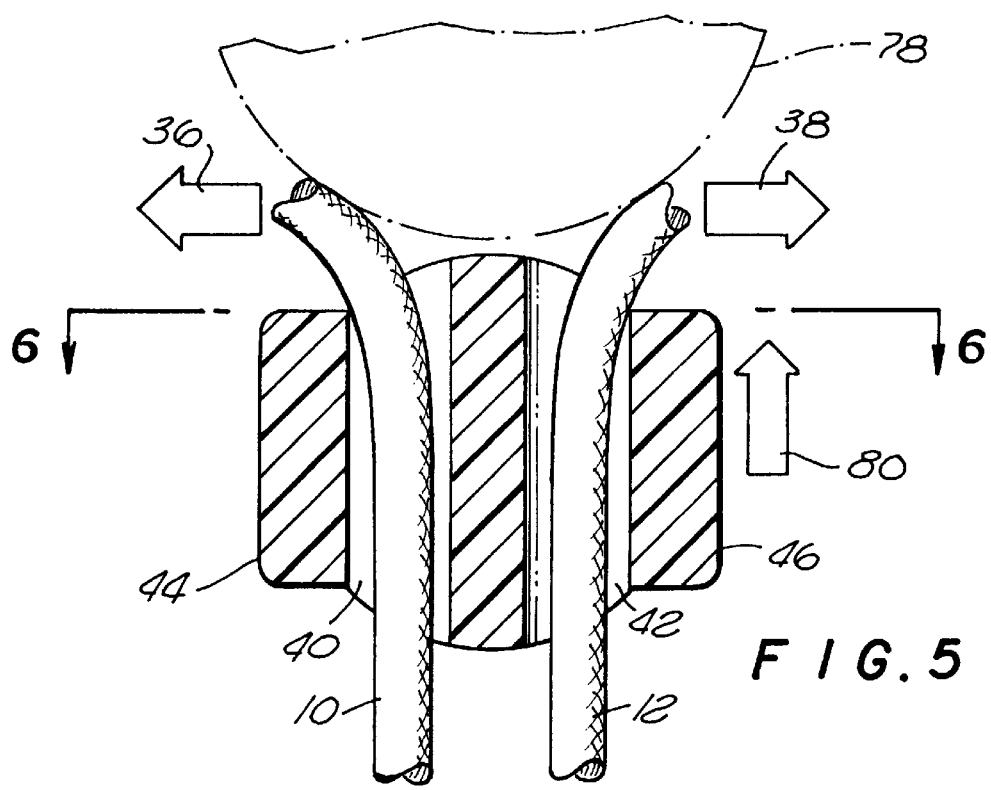
FIG. 5 is a vertical sectional view similar to FIG. 2 but showing the two lengths of cord with an outward force exerted on them.

Although detailed illustrative embodiments are disclosed herein, other suitable structures and machines for practicing the invention may be employed and will be apparent to persons of ordinary skill in the art. Consequently, specific structural and functional details disclosed herein are representative only; they describe the preferred embodiments of the invention.

FIGS. 1–7 illustrate an elastomeric cord lock 2 with two passages 4 and 6 passing through a body of resiliently deformable elastomeric material 8. Two lengths of cord 10 and 12 pass through the passages 4 and 6, respectively. When the passages 4 and 6 are in a normal, unstressed condition, each passage has a keyhole-shaped cross section 14 and 16 respectively (FIG. 4). Ends of the lengths of cord 18 and 20 can be tied off with knots 22 and 24 in order to prevent the lengths of cord 10 and 12 from pulling out from the passages 4 and 6 (FIG. 1). Two other ends of the lengths of cord 26 and 28 lead to an object around which or to which the cord lock 2 is to be fastened. The dashed line of FIG. 1 represents a cord loop 30. The loop 30 can serve to fasten a shoe, or a handbag, for example. The ends 26 and 28 do not need to form a loop, but can also be separately and individually connected to an object. When the lengths of cord 10 and 12 are substantially parallel to each other, as illustrated in FIGS. 1–4, they rest within substantially cylindrical wall portions 32 and 34 of the passages 4 and 6. In this condition the lengths of cord can easily slide relative to the body, yet will not shake loose from their positions.

Figure 6:
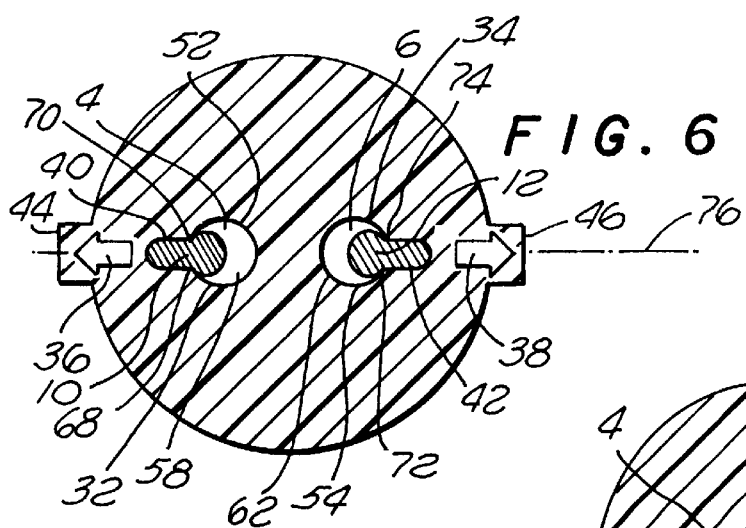
FIG. 6 is a horizontal cross-sectional view of the cord lock taken on line 6—6 of FIG. 5. The outward forces exerted on the lengths of cord are shown to deform the cords and the passages.

FIGS. 5 and 6 illustrate outward forces 36 and 38 being applied to the lengths of cord 10 and 12, causing the lengths of cord 10 and 12 to engage narrow slot portions 40 and 42. As shown in FIG. 6, the outward forces 36 and 38 cause the narrow slot portions 40 and 42, as well as the lengths of cord 10 and 12, to deform. As the slot portions 40 and 42 deform, the resilient elastomeric material exerts greater force against the lengths of cord 10 and 12, resulting in greater locking force between the passages 4 and 6 and the lengths of cord 10 and 12. Also, as greater force is applied to the lengths of cord 10 and 12, they are pulled further into the slot portions 40 and 42, resulting in greater surface area contact between the lengths of cord 10 and 12 and the slot portions 40 and 42, resulting in even greater locking force.

Figure 7:
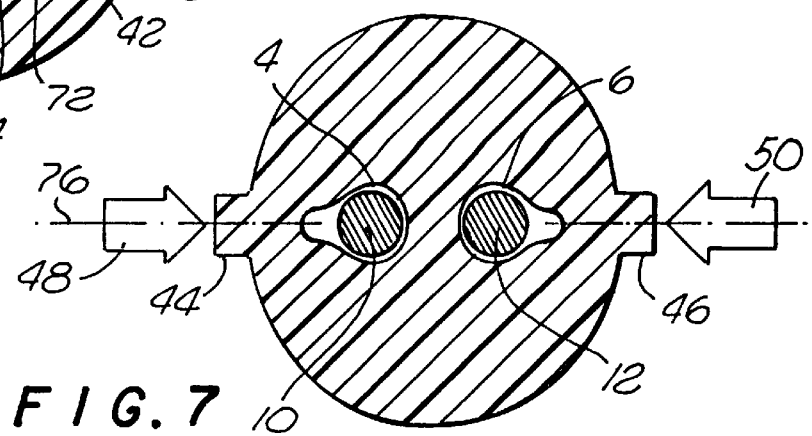
FIG. 7 is the view of FIG. 6 with inward force being exerted on the cord lock in order to deform the cord lock and release the lengths of cord.

FIG. 7 shows how the lengths of cord are released from the slot portions of the passages by pressing inwardly on outward projections, 44 and 46. This produces inwardly directed forces 48 and 50 on the slot portions, spreading the slot portions 40 and 42 and allowing the lengths of cord 10 and 12 to slide along the passages.

The cord lock body 8 can be made of rubber or any of a variety of synthetic polymers with elastic properties resembling those of natural rubber. More specifically, in one embodiment the cord lock body 8 is made from a virgin vinyl compound and with a Shore hardness on the A scale between about 45 and 55, and preferably about 50. The use of such elastomeric materials for manufacturing single piece and multi-piece items is well known in the art. Other embodiments use rubber, or other materials possessing elastomeric properties. An important characteristic of any material used for the cord lock body 8 is that when the material is deformed from its original shape, the material's resilience will tend to return the material to its original shape. As shown by FIG. 1, the cord lock body 8 has a generally spherical shape except where it is interrupted by the first and second outward projections 44 and 46. The cord lock body 8 can also have any other shape which allows for deformation of the passages 4 and 6.

Use of the two passages 4 and 6 is desirable because many applications require locking two lengths of cord together (for example, locking the two ends of a drawstring or shoelace together). However, in other embodiments, three or more passages can be used when the application so requires. As illustrated in FIG. 2, interior side wall surfaces 52 and 54 of the passages 4 and 6 can have a smooth finish in order to decrease wear and increase friction. In one embodiment, the passages 4 and 6 pass longitudinally through the cord lock body 8 and are substantially parallel to each other. However, the passages 4 and 6 can also extend at an angle relative to each other as long as the angle allows the cords to slide along the passages and provides locking force against the passages as described herein. As shown in FIG. 2, the first passage 4 is substantially enclosed by the elastomeric material of the cord lock body 8, except for openings 56 and 58 at opposite ends of the first passage 4. The second passage 6 is also substantially enclosed by the elastomeric material of cord lock body 8, except for openings 60 and 62 at opposite ends of the second passage 6.

A first section, portion, or length of cord 10, passes through the first passage 4. A second length of cord 12, passes through the second passage 6. Each length of cord can be a portion of a single cord, as illustrated by the cord loop or dashed line 30 in FIG. 1 showing lengths of cord 10 and 12 forming a single connected cord. For example, the single cord might be the drawstring of a garment or a bag. The single cord might also be a shoelace. Dashed line 30 can lead to any object that the cord lock 2 is to be tightened against. Alternatively, each length of cord can be part of a separate cord wherein each separate cord runs though one of the passages. Also, in some applications, more than a single length of cord can pass through a passage.

In one embodiment, the lengths of cord 10 and 12 are formed of a looselybraided cord of the type commonly used in the clothing industry. This type of cord can have tips 64 and 66 permitting it to be easily threaded though the passages 4 and 6. The cord should compress to a minimum width of 0.032" and the tips should be the industry standard 0.625" length for easy threading through the passages 4 and 6. Such standard loosely-braided cords provide the advantage of being inexpensive and readily available. They also permit the lengths of cord 10 and 12 to slide easily relative to the substantially cylindrical wall portions of the passages because the friction is just enough to keep the cord lock 2 from being shaken loose from its position relative to the lengths of cord 10 and 12. However, when the loosely-braided cord engages the slot portions of the passages, substantial locking force is provided. Other cord dimensions or materials can be used for different applications. For applications requiring greater locking force, the cord can be made from the same virgin vinyl compound as the cord lock body 8, or a similar rubber or polymeric material. For example, the cord can be made from soft vinyl rods, rubber rods, soft vinyl tubes, or rubber tubes. The cord can also be made from other materials which will provide greater friction between the cord and passages and thus provide greater locking force.

As pointed out above, the first and second lengths of cord 10 and 12 can have their ends 18 and 20 tied off in the knots 22 and 24, as illustrated in FIG. 1. These knots keep the cord ends 18 and 20 from slipping out from the passages 4 and 6. The ends 18 and 20 can also be tied to each other in order to prevent them from slipping out. Rather than tying off the cord ends, other obstructions can be attached to the cords to keep them from slipping out from the passages. Also, when it is desired for the lengths of cord 10 and 12 to easily slip out from the passages 4 and 6, the cord ends can be kept free of knots or obstructions. The combined use of the two passages 4 and 6 with knots or other obstructions in the cord ends 18 and 20, provides an advantage over the prior art by better preventing the cord ends 18 and 20 from slipping out from the passages 4 and 6.

FIG. 4 illustrates the cord lock 2 in its normal at rest condition, when no deforming forces are being applied to it. In this condition, the passages 4 and 6 have the first and second keyhole-shaped cross sections 14 and 16, respectively. The keyhole-shaped cross section 14 is formed from the interior side wall surface 52 of the passage 4. The interior side wall surface 52 is formed from the substantially cylindrical wall portion 32, and a first narrow slot portion 40. The narrow slot portion 40 extends outwardly away from the second passage 6 and extends longitudinally along the entire length of the first substantially cylindrical wall portion 32. Similarly, the keyhole-shaped cross section 16 is formed from the interior side wall surface 54 of the passage 6. The interior side wall surface 54 is formed from the second substantially cylindrical wall portion 34, and the second narrow slot portion 42. The narrow slot portion 42 extends outwardly away from the first passage 4 and extends longitudinally along the entire length ofthe second substantially cylindrical wall portion 34. Thus, the keyhole-shaped cross sections 14 and 16 each has a wide end formed from the substantially cylindrical wall portions 32 and 34 and a narrow end formed from the narrow slot portions 40 and 42. In one embodiment, the cross sections 14 and 16 remain unchanged along the entire lengths of the passages 4 and 6. However, in other embodiments, each of the passages 4 and 6 can have a cross section that varies along its length. For example, the cross sections 14 and 16 can taper from larger to smaller widths along the lengths of the passages 4 and 6. Also, the cross section 14 can be different from the cross section 16, if desired.

The keyhole-shaped cross section of the present embodiment is highly beneficial. The narrow slot portions 40 and 42 and the substantially cylindrical wall portions 32 and 34 connect to form protruding edges, 68, 70, 72 and 74 (FIG. 3). These edges provide extra resistance as lengths of cord 10 and 12 are forced against them in the locked conditions of FIGS. 5 and 6. Further, the substantially cylindrical wall portions 32 and 34 allow the lengths of cord 10 and 12 to slide easily relative to the passages when the lengths of cord 10 and 12 are substantially parallel to each other because the friction is just enough to keep the cord lock 2 from being shaken loose from its position relative to the lengths of cord 10 and 12. When the outward forces 36 and 38 are applied to the lengths of cord 10 and 12, the lengths are pulled against the edges 68, 70, 72 and 74 and into the narrow slot portions 40 and 42 (FIGS. 5 and 6), thus providing greater friction and greater locking force.

Although in one embodiment the passages 4 and 6 have keyhole cross sections, in other embodiments the passages can have cross sections of other shapes. For example, each passage can have a cross section which tapers linearly from wide to narrow in the outward direction. This provides the advantage of providing smoothly increasing locking force as the outward forces 36 and 38 are exerted on the lengths of cord 10 and 12.

FIGS. 1 and 4 illustrate the first and second outward projections 44 and 46 extending outwardly from opposite sides of the cord lock body 8. The outward projections 44 and 46 are elongated essentially longitudinally of the passages 4 and 6. As shown in FIG. 4, the first and second passages, 4 and 6, and the first and second outward projections 44 and 46 lie along a common axis 76. Use of these projections aids in transferring the inwardly directed forces 48 and 50 towards the narrow slot portions 40 and 42. The outward projections 44 and 46 and the cord lock body 8 are formed from a single piece of resiliently deformable elastomeric material. However, in other embodiments, the outward projections 44 and 46 and the cord lock body 8 can be separate pieces and be made of different materials. Also, the cord lock 2 can be produced without the outward projections 44 and 46 and the inward forces 48 and 50 are applied directly to the cord lock body 8.

In operation, the cord loop 30, illustrated in FIG. 1, may be positioned to encircle an object 78. As stated above, FIGS. 1–4 illustrate the cord lock 2 in its normal, unstressed condition with the lengths of cord 10 and 12 substantially parallel to each other and resting within the substantially cylindrical wall portions 32 and 34 of passages 4 and 6. In this condition the lengths of cord slide easily relative to the passages, yet cannot be shaken loose from their positions.

In order to tighten the cord, a user holds lengths of cord 10 and 12 at ends 18 and 20 and pushes cord lock 2 toward object 78 in the direction indicated by arrow 80 as shown in FIG. 5. As illustrated in FIGS. 5 and 6, this produces the outward forces 36 and 38 on the lengths of cord 10 and 12, drawing the lengths of cord into the narrow slot portions 40 and 42. As shown in FIG. 6, this deforms the narrow slot portions 40 and 42, as well as the lengths of cord 10 and 12. As the slot portions 40 and 42 deform, the resilient elastomeric material exerts increasing force against the lengths of cord 10 and 12, resulting in greater locking forces between the passages 4 and 6 and the lengths of cord 10 and 12. Also, as greater force is applied to the lengths of cord 10 and 12, they are pulled further into the slot portions 40 and 42, causing the lengths of cord 10 and 12 to contact the slot portions 40 and 42 over a greater area. This results in an even greater locking force. The result is to maintain the lengths of cord 10 and 12 in a state of tension encircling the object 78.

It shall be understood that the term "locking force", as used in this disclosure, does not mean that the lengths of cord 10 and 12 are absolutely restrained from movement by the cord lock 2. The "locking force" represents the resistance to movement between the lengths of cord 10 and 12 and the cord lock passages 4 and 6.

FIG. 7 shows how the lengths of cord are released from the slot portions of the passages by pressing inwardly on the outward projections 44 and 46. This produces the inwardly directed forces 48 and 50 on the slot portions 40 and 42, spreading the slots and allowing the lengths of cord 10 and 12 to slide along the passages 4 and 6.

While the above description contains many specific features of the invention, these should not be construed as limitations on the scope of the invention, but rather as an exemplification of one preferred embodiment thereof. Many other variations are possible. Accordingly, the scope of the invention should be determined not by the embodiments illustrated, but by the appended claims and their legal equivalents.

What is claimed is:

1. A cord lock, comprising:
    a body of resiliently deformable elastomeric material having walls defining first and second enclosed passages extending from one end of the body to an opposite end;
    a first length of cord passing through the first of said passages and a second length of cord passing through the second of said passages;
    wherein each of the passages is formed in cross section with a wide end and a narrow end in a normal condition to which the body tends to return, with the narrow end being dimensioned to grip said lengths of cord against longitudinal movement through said passages;
    the narrow end of the cross section of each passage extending outwardly relative to the other passage; and
    said passages being formed such that in a compressed condition caused by inward pressure on the body toward said respective narrow ends, said narrow ends are widened to release said lengths of cord.

2. A cord lock as recited in claim 1, wherein each of said cross sections is shaped as a keyhole when viewed in said predetermined transverse plane.

3. A cord lock as recited in claim 1, wherein said passages are substantially parallel to each other.

4. A cord lock as recited in claim 1, wherein said wide ends are substantially circular.

5. A cord lock as recited in claim 1, wherein said narrow ends are outwardly extending slot portions of said passages.

6. A cord lock as recited in claim 1, wherein said passages are enclosed by said resiliently deformable elastomeric material.

7. A cord lock as recited in claim 6, wherein said lengths of cord are lengths of a tipped, loosely-braided cord.

8. A cord lock as recited in claim 6, wherein said lengths of cord are lengths of a cord selected from the group consisting of soft vinyl rods, soft vinyl tubes, rubber rods and rubber tubes.

9. A cord lock as recited in claim 1, wherein said first and second lengths of cord are portions of a single cord.

10. A cord lock as recited in claim 1, wherein said first length of cord is a portion of a first cord and said second length of cord is a portion of a second cord.

11. A cord lock as recited in claim 1, in which said cord lock further comprises:
    first and second projections extending outwardly from said body and elongated essentially longitudinally of said passages.

12. A cord lock as recited in claim 11, wherein said inward pressure is exerted on said projections toward said narrow ends.

13. A cord lock, comprising:
    a body of resiliently deformable elastomeric material having walls defining first and second passages therethrough, and wherein said passages are enclosed by said resiliently deformable elastomeric material;
    a first length of cord passing through the first of said passages and a second length of cord passing through the second of said passages;
    wherein each of the passages is formed in cross section with a wide end and a narrow end in a normal condition to which the body tends to return, with the narrow end being dimensioned to grip said lengths of cord against longitudinal movement through said passages;
    the narrow end of the cross section of each passage extending outwardly relative to the other passage;
    said first and second passages disposed so that when said lengths of cord exert outward forces in the directions of said narrow ends, said narrow ends are urged against said lengths of cord by the resilience of said elastomeric material, to thereby resist movement of said first and second lengths of cord longitudinally along said passages;
    said passages being formed such that in a compressed condition caused by inward pressure on the body toward said respective narrow ends, said narrow ends are widened to release said lengths of cord.

14. A cord lock, comprising:
    a body of resiliently deformable elastomeric material defining a first passage through which a first length of tipped, loosely-braided cord extends;
    said body defining a second passage through which a second length of tipped, loosely-braided cord extends;
    said first and second lengths of cord prevented from slipping out from said passages by obstructions located along said lengths of cord;
    said first and second passages passing through said body substantially parallel to each other;
    said first and second passages enclosed by the elastomeric material of said body, except for openings at opposite ends of said first and second passages;
    said first passage, as viewed in a predetermined transverse plane, having a first keyhole-shaped cross section in a normal condition to which said body tends to return, wherein said first keyhole-shaped cross section is formed from an interior side wall surface of said first passage comprising a first substantially cylindrical side wall surface with a first slot portion extending outwardly from said substantially cylindrical wall in a direction outwardly away from said second passage and extending longitudinally along the entire length of said first substantially cylindrical wall;

said second passage, as viewed in a predetermined transverse plane, defining a second keyhole-shaped cross section in a normal condition to which the resilience of said body tends to return, wherein said second keyhole-shaped cross section is formed from an interior side wall surface of said second passage comprising a second substantially cylindrical side wall surface with a second slot portion extending outwardly from said substantially cylindrical wall in a direction outwardly away from said first passage and extending longitudinally along the entire length of said second substantially cylindrical wall;

said first and second passages disposed so that when said first and second lengths of cord are parallel, said first length of cord is in contact with said first substantially cylindrical wall and said second length of cord is in contact with said second substantially cylindrical wall, and said lengths of cord can slide relative to said body;

said first and second passages further disposed so that when said first length of cord exerts an outward force in the direction of the first slot portion and when said second length of cord exerts an outward force in the direction of said second slot, said first and second slot portions engage said first and second lengths of cord and said slot portions are urged against said lengths of cord by the resilience of said elastomeric material, to thereby resist movement of said first and second lengths of cord longitudinally along said first and second passages;

first and second projections extending outwardly from opposite sides of said body and elongated essentially longitudinally of said passage;

said first and second projections and said first and second passages laying along a common axis as viewed in said predetermined transverse plane;

said elastomeric body being manually compressible by a user applying inwardly directed force to said first and second projections parallel to said common axis in a manner spreading said first and second slot portions against the resilience of said elastomeric material and releasing said first and second lengths of cord for movement along said passages.

\* \* \* \* \*